United States Patent [19]
Ando

[11] 3,878,440
[45] Apr. 15, 1975

[54] ELECTROLYTIC CAPACITOR VENT

[75] Inventor: Susumu Ando, Minamiazumi, Japan

[73] Assignee: Nichicon Capacitor Limited, Kyoto, Japan

[22] Filed: July 23, 1973

[21] Appl. No.: 381,807

[52] U.S. Cl. ............................................. 317/230
[51] Int. Cl. ........................................... H01g 9/12
[58] Field of Search ................................... 317/230

[56] References Cited
UNITED STATES PATENTS

| | | |
|---|---|---|
| 2,274,327 | 2/1942 | Georgiev et al. ................... 317/230 |
| 3,204,156 | 8/1965 | Moresi et al. ....................... 317/230 |
| 3,221,217 | 11/1965 | Hucke ................................. 317/230 |
| 3,280,381 | 10/1966 | Ayer ................................... 317/230 |
| 3,688,162 | 8/1972 | Willy et al. ......................... 317/230 |

Primary Examiner—John Zazworsky
Assistant Examiner—William D. Larkins

[57] ABSTRACT

A sealed capacitor having a casing including a top wall having portions of reduced thickness so that excessive pressure developed within the casing will rupture the portions of reduced thickness.

1 Claim, 3 Drawing Figures

(A)

(B)

ELECTROLYTIC CAPACITOR VENT

This invention relates to an electrolytic capacitor and more specifically to an improved pressure vent structure thereof.

When an inverse voltage, continuous excessive voltage or extraordinary pulse is applied to an electrolytic capacitor, an excessive current flows through the electrolyte and causes electrolysis to produce a gas. Moreover, the internal pressure is raised by Joule's heat due to the internal resistance and sometimes the capacitor explodes by the excessive pressure. The same phenomenon may be caused by deterioration of the capacitor element. Although there is some variance in the magnitude of the breaking pressure depending upon the construction and material of the capacitor, it is about 30 killograms/cm$^2$ in those having a cylindrical casing of about 10 millimeters in diameter. Therefore, the explosion of the capacitor is sometimes quite dangerous.

According to prior techniques, safety means have been used by forming a through-hole in the sealing plate or terminal plate and closing the hole with a thin rubber plate, so that the rubber plate is broken by the internal pressure. However, it is difficult to obtain a constant breaking pressure because the strength of the rubber plate depends upon various parameters such as thickness, hardness, kind of rubber and the like which is difficult to control. Moreover, the rubber plate may deteriorate with a lapse of time and the pressure vent function may become unreliable.

Therefore, an object of this invention is to provide an improved pressure vent structure for an electrolytic capacitor, which is simple and more reliable than prior art vents.

According to this invention, the top of the casing has a portion which is made thinner than the remainder of the top. More specifically, the top face of the casing has a plurality of domains which are defined by boundaries including a plurality of radial lines intersecting at the center of the top face.

This invention will be described in detail hereinunder with reference to the accompanying drawings.

In the drawings:

FIG. 2 (B) is a cross sectional view of the capacitor of FIG. 2 (A).

Throughout the drawings, like reference numerals are used to denote like structural components.

Figure 1:
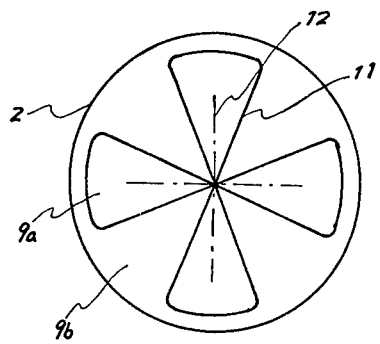
FIG. 1 is a cross sectional view representing an example of an electrolytic capacitor including a prior art pressure vent structure.
Figure 1:
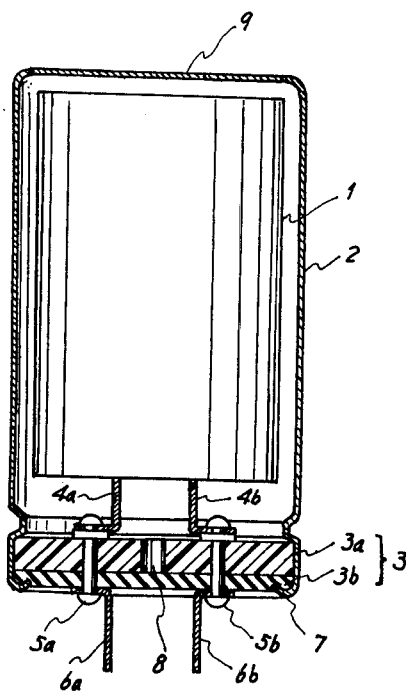

Referring now to FIG. 1, there shown is an electrolytic capacitor provided with a pressure vent structure according to the prior art. The capacitor comprises an aluminium casing 2 containing a capacitor element 1 which is coaxially arranged therein, and a terminal plate 3 which air-tightly closes the open end of the casing 2 by being fixed thereto by swaging the open edge 7 as shown. The terminal plate 3 has a pair of rivets 5a and 5b passing therethrough. Terminals 4a and 4b of the capacitor element 1 are fixed to the inner ends of the rivets and terminal leads 6a and 6b are fixed to the outer ends. The terminal plate 3 consists of a plastic disc 3a and a rubber disc 3b and the plastic disc 3a has a through hole 8 in the center.

When the internal pressure of the capacitor of FIG. 1 is raised above a specific level, the rubber disc 3b is broken and the internal gas is exhausted through the hole 8. However, the pressure at which the rubber disc is broken is dependent almost entirely upon the strength of the rubber disc which is difficult to precisely control, and the reliability of the pressure vent function is unavoidably reduced. Although the above construction of pressure vent structure is given merely by way of illustration, there are many variations of constructions, though it is common to adopt a rubber layer as a safety valve and the same disadvantage also occurs in the variations.

Figure 2:
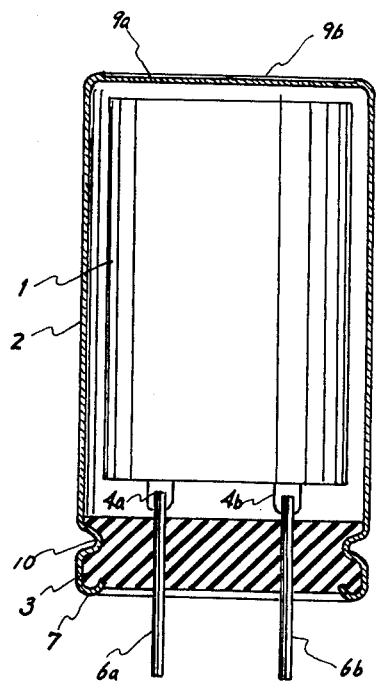
FIG. 2 (A) is a plan view of an embodiment of the electrolytic capacitor including the pressure vent structure according to this invention.

Referring next to FIGS. 2A and 2B there shown is an embodiment of electrolytic capacitor provided with a pressure vent structure according to this invention. The capacitor comprises a capacitor element 1, an aluminium casing 2 and a terminal plate 3. The terminal plate 3 consists of a single rubber disc and is fixed to the open end of the casing 2 by swaging the open edge 7 and forming a circumferential groove 10 as shown. A pair of terminal leads 6a and 6b pass through the terminal plate 3 and are welded directly to terminals 4a and 4b of the capacitor element 1. Due to the simplified structure of terminal plate 3, simple lead-out means can be adopted.

Referring especially to FIG. 2(A), there shown is a top face of the casing 2 of this invention, including a flower-like pattern 9a. The pattern 9a has a contour including four diametral lines 11 intersecting at the center. According to this invention, the inside portion 9a of the flower-like pattern has a thickness which is substantially less than that of the outer portion 9b. Such a pattern can be formed by a coin-pressing process. When the internal pressure of the casing 2 is raised, the internal stress of the material of the top wall of the casing is collected at the center and the top wall is broken typically along two orthogonal chain lines 12. As the strength and thickness of the top wall of the metal casing can be controlled precisely, the pressure at which the casing is broken can be maintained substantially constant and the pressure vent function of the capacitor is therefore reliable.

As an example, the pressure vent pattern of FIG. 2(A) was used on 50 aluminium casings having a diameter of 10 millimeters a height of 13 millimeters and a wall thickness of 0.4 millimeter. The inner portion 9a was arranged with a thickness of 0.2 millimeters, while the outer portion 9b had a thickness of 0.4 millimeters. The internal pressure of each casing was raised in 2 killograms/cm$^2$ steps, keeping each pressure constant for 1 minute at each step. The internal pressures at which the casings were broken and the number of casings broken at each pressure are given in the following table.

| INTERNAL PRESSURE (Kg/cm$^2$) | NUMBER OF BROKEN CASINGS |
| --- | --- |
| 14 | 16 |
| 16 | 29 |
| 18 | 4 |
| 20 | 1 |

All casings were broken within 20 to 40 seconds after the listed internal pressures were reached. As shown in the table, all of the tested casings were broken within a pressure range of 6 killograms/cm$^2$ and 90 percent thereof were broken within a range as narrow as 2 killograms/cm². This variance of the actuating pressure is significantly less than that of the prior art structure, which may be about 10 killograms/cm² or higher.

It should be noted that the above description is only for illustrative purposes and various modifications can be made within the scope of this invention. For example, the number and shape of petals 9a and 9b can be arbitrarily selected in accordance with the desired actuating pressures. Moreover, other shapes of patterns such as circles, squares, crosses and the like can be adopted in place of the flower-like pattern, though they may be somewhat inferior in comparison with the flower-pattern.

The pressure vent structure of this invention not only provides improved reliability of the pressure vent function but also simplifies the construction and manufacturing process of the capacitor.

What is claimed:

1. An electrolytic capacitor comprising a cylindrical housing, a wall integrally formed with said housing and closing one end thereof, an electrolytic capacitor within said housing and having terminals extending therefrom, and means closing the other end of said housing with the terminals extending therethrough, said wall having a plurality of wedge-shaped sectors angularly spaced one from the other and radiating outwardly from a common center, the wall portions forming said sectors each having a thickness less than the remaining portions of said wall whereby said sectors form a precise pressure release means should the pressure exceed a predetermined magnitude within said housing.

* * * * *